(12) United States Patent
Sata

(10) Patent No.: US 10,801,856 B2
(45) Date of Patent: Oct. 13, 2020

(54) AUTOMATIC VEHICLE MAP DISPLAY SCALING SYSTEM

(71) Applicant: Toyota Motor Engineering & Manufacturing North America, Inc., Erlanger, KY (US)

(72) Inventor: Andrew G. Sata, Irvine, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 368 days.

(21) Appl. No.: 15/865,108

(22) Filed: Jan. 8, 2018

(65) Prior Publication Data

US 2019/0212162 A1 Jul. 11, 2019

(51) Int. Cl.
*G01C 21/36* (2006.01)

(52) U.S. Cl.
CPC ....... *G01C 21/367* (2013.01); *G01C 21/3691* (2013.01)

(58) Field of Classification Search
CPC .......................... G01C 21/367; G01C 21/3691
See application file for complete search history.

(56) References Cited

U.S. PATENT DOCUMENTS

| | | | |
|---|---|---|---|
| 6,163,752 A | 12/2000 | Sievers et al. | |
| 6,567,744 B1* | 5/2003 | Katayama | G01C 21/36 701/410 |
| 6,825,855 B2 | 11/2004 | Maeda et al. | |
| 7,212,920 B1 | 5/2007 | Bailey et al. | |
| 7,844,395 B2 | 11/2010 | Aoyama | |
| 8,095,307 B2 | 1/2012 | Ebert et al. | |
| 8,386,173 B2* | 2/2013 | Muzina | G01C 21/367 345/428 |
| 8,442,768 B2 | 5/2013 | Sasaki | |
| 2005/0099323 A1* | 5/2005 | Hirose | G01C 21/3691 340/995.13 |
| 2007/0150189 A1* | 6/2007 | Han | G01C 21/367 701/455 |
| 2008/0228388 A1 | 9/2008 | Tauchi et al. | |
| 2008/0275645 A1 | 11/2008 | Hoshino | |
| 2011/0043539 A1 | 2/2011 | Hiroki | |

(Continued)

FOREIGN PATENT DOCUMENTS

| | | |
|---|---|---|
| CN | 202255412 | 5/2012 |
| DE | 10027516 A1 * | 12/2001 |
| JP | 63073111 | 4/1988 |

(Continued)

*Primary Examiner* — Michael J Zanelli
(74) *Attorney, Agent, or Firm* — Snell & Wilmer LLP

(57) ABSTRACT

Methods, systems, and apparatus for dynamically scaling a map of a navigation display system of a vehicle. The system includes a GPS unit configured to detect a current location of the vehicle. The system includes a transceiver configured to receive a current traffic condition from a remote data server. The system includes a display configured to display the map. The system also includes an ECU configured to dynamically determine a map display scale based on a location of the vehicle and a traffic condition. The ECU is also configured to render the map using the dynamically determined map display scale. The ECU is also configured to change the map display scale based on a change in location of the vehicle or a change in traffic condition.

18 Claims, 10 Drawing Sheets

(56) References Cited

U.S. PATENT DOCUMENTS

2019/0195648 A1* 6/2019 Pogel .................. G01C 21/367

FOREIGN PATENT DOCUMENTS

| | | |
|---|---|---|
| JP | 4219783 | 8/1992 |
| JP | 8137391 | 5/1996 |
| KR | 2007103154 | 10/2007 |
| KR | 2008086668 | 9/2008 |

* cited by examiner

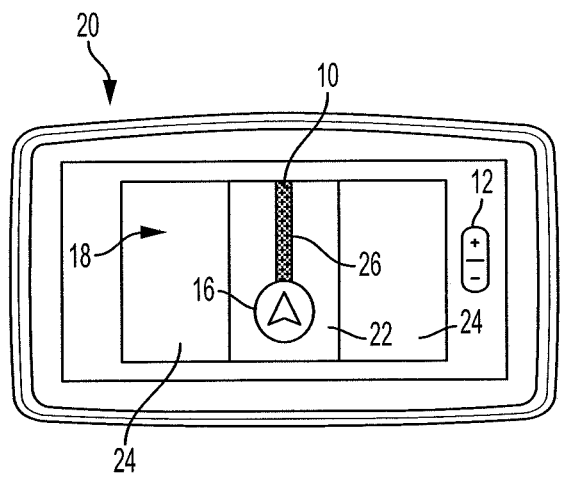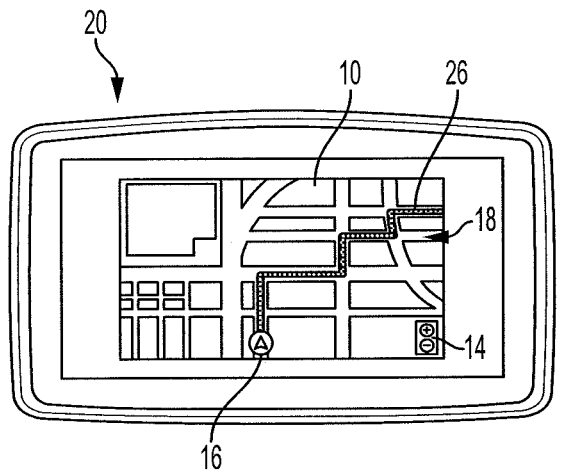
FIG. 1A  FIG. 1B
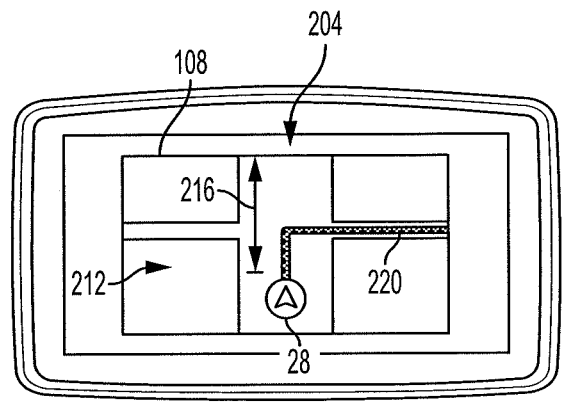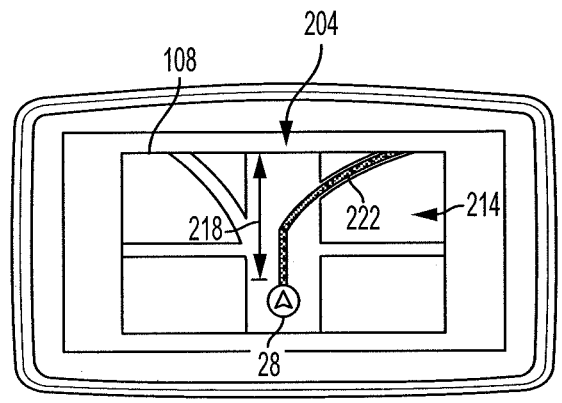
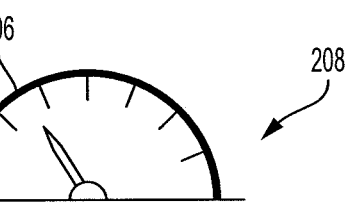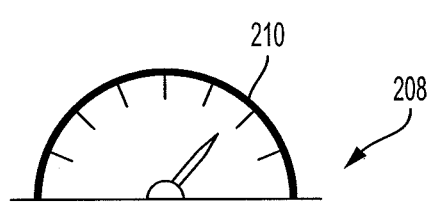
FIG. 2A  FIG. 2B

700

| LOCATION | TRAFFIC | MAP DISPLAY SCALE |
|---|---|---|
| FREEWAY | HEAVY | 1 MIN |
| | MODERATE | 2 MIN |
| | CLEAR | 5 MIN |
| RESIDENTIAL | HEAVY | 30 SEC |
| | MODERATE | 1 MIN |
| | CLEAR | 2 MIN |
| CITY | HEAVY | 15 SEC |
| | MODERATE | 30 SEC |
| | CLEAR | 1 MIN |
| DEFAULT | HEAVY | 1 MIN |
| | MODERATE | 2 MIN |
| | CLEAR | 3 MIN |

FIG. 7

AUTOMATIC VEHICLE MAP DISPLAY SCALING SYSTEM

BACKGROUND

1. Field

This specification relates to a system and a method for automatically scaling a map on a display for a vehicle.

2. Description of the Related Art

A vehicle may have a navigation system which is used in conjunction with a display, for instructing and guiding a driver to a destination. The navigation system may also display a map for the driver's reference, without providing driving directions to a destination. Some navigation systems use a static map scale, where a static distance amount of the map is displayed at all times, and the map moves based on the location of the vehicle. For example, the map is a 1 mile by 1 mile display of the area surrounding the vehicle. These navigation systems may not show the map in sufficient detail to be useful to the driver in areas where streets are close together, or these systems may not show the map with sufficient surrounding areas displayed to be useful to the driver.

Other navigation systems allow the user to zoom in and out, but only upon receiving an indication from the user to zoom in or out. In these systems, the user may manually zoom in when in an area densely occupied by streets (e.g., a downtown area of a major city) and the user may manually zoom out when in an area sparsely occupied by streets (e.g., a long and open interstate road). However, these navigation systems may be distracting for the driver to use, as the driver may be constantly adjusting the zoom level of the map manually, and more likely in situations where maneuvers are required, magnifying the consequences of being distracted.

SUMMARY

What is described is a dynamically scaling navigation display system for a vehicle. The system includes a GPS unit configured to detect a current location of the vehicle. The system also includes a transceiver configured to receive a current traffic condition from a remote data server. The system also includes a display configured to display a navigation user interface including a map and an icon within the map representing the vehicle. The system also includes an electronic control unit (ECU). The ECU is configured to determine an initial map display scale based on an initial location of the vehicle and an initial traffic condition. The ECU is also configured to render the map of the navigation user interface using the initial map display scale. The ECU is also configured to detect a change in the initial location of the vehicle to an updated location of the vehicle and/or a change in the initial traffic condition to an updated traffic condition. The ECU is also configured to determine an updated map display scale based on the updated location of the vehicle and/or the updated traffic condition, the updated map display scale being more zoomed in or more zoomed out than the initial map display scale. The ECU is also configured to render the map of the navigation user interface using the updated map display scale.

Also described is a dynamically scaling navigation display system for a vehicle. The system includes a display configured to display a navigation user interface including a map and an icon within the map representing the vehicle, the map having a boundary faced by the icon, and a temporal map distance separating the icon and the boundary. The system also includes a speed sensor configured to detect a current speed of the vehicle. The system also includes an input unit configured to receive, from a user, a target zoom level indicating a user preference of an amount of travel time corresponding to the temporal map distance. The system also includes an electronic control unit (ECU). The ECU is configured to determine an initial map display scale for the map rendered on the display based on the target zoom level and an initial speed of the vehicle. The ECU is also configured to render the map of the navigation user interface using the initial map display scale. The ECU is also configured to detect a change in the initial speed of the vehicle to an updated speed of the vehicle. The ECU is also configured to determine an updated map display scale for the map rendered on the display based on the target scaling level and the new speed of the vehicle, such that the temporal map distance is increased when the updated speed is greater than the initial speed or decreased when the updated speed is less than the initial speed. The ECU is also configured to render the map of the navigation user interface using the updated map display scale.

Also described is a method for dynamically scaling a map of a navigation user interface of a vehicle. The method includes determining, by an electronic control unit (ECU), an initial map display scale for the map based on an initial location of the vehicle or based on an initial speed of the vehicle. The method also includes rendering, by the ECU, the map with the initial map display scale. The method also includes displaying, by a display, the map with the initial map display scale. The method also includes determining, by the ECU, an updated map display scale for the map based on a change from the initial location of the vehicle to an updated location of the vehicle or based on a change from the initial speed of the vehicle to an updated speed of the vehicle. The method also includes rendering, by the ECU, the map with the updated map display scale. The method also includes displaying, by the display, the map with the updated map display scale.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 1A and 1B illustrate a display showing a map and an icon representing a vehicle, according to various embodiments of the invention.

FIGS. 2A and 2B illustrate a display showing a map having an optimized map scale and an icon representing a vehicle, according to various embodiments of the invention.

FIG. 7 illustrates an example map zoom table, according to various embodiments of the invention.

DETAILED DESCRIPTION

Figure 3A:
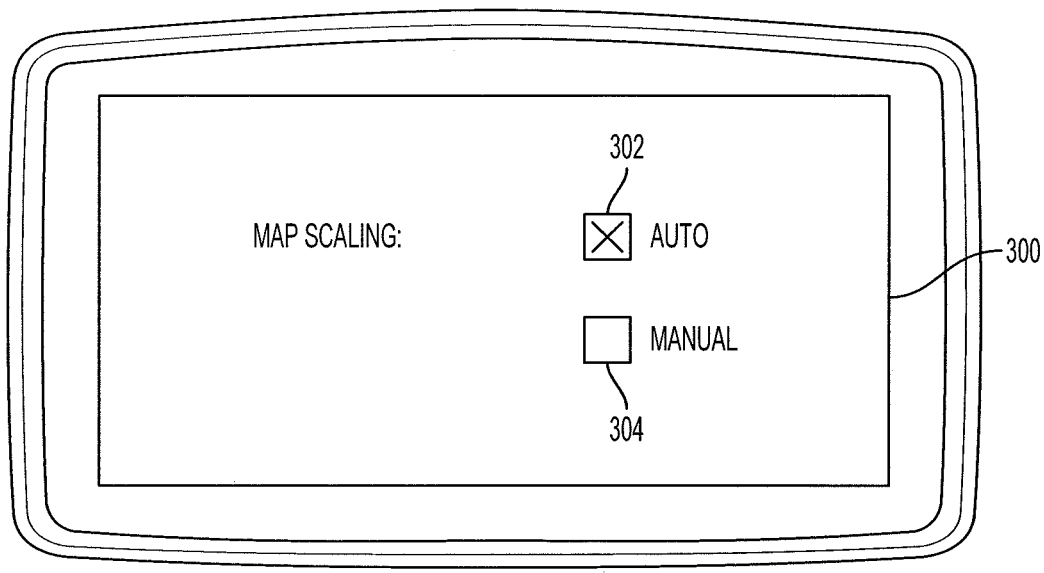
FIGS. 3A-3E illustrate various user interface screens for establishing settings of the automatic vehicle map display system, according to various embodiments of the invention.

Disclosed herein are systems, vehicles, and methods for automatically adjusting a map display scale (or map scaling level or map zoom level) for a navigation system of a vehicle. Conventional navigation systems displaying a map on a display within the vehicle have a static map display scale or the map display scale may be manually adjusted. When the map display scale is static, the map may not have sufficient details to be useful to the driver. For example, when the map has a scale of 1 mile by 1 mile, the map may be so zoomed out that the driver may not know exactly which street the driver should turn on. While the navigation system may provide the street name, in many situations, the actual street signs may not be visible or may be obscured. In another example, when the map has a scale of 500 feet by 500 feet, the driver may not be able to anticipate the driver's next maneuver, as it is off of the displayed map.

Other conventional navigation systems allow the user to manually zoom in or manually zoom out, but making these manual adjustments is distracting for the driver. In addition, drivers may often zoom in when a maneuver is imminent, which is ironically when the driver should be paying particularly more attention to the road.

The systems, vehicles, and methods disclosed herein describe automatically adjusting a map display scale for a navigation system of a vehicle. In this way, the map shows an appropriate amount of the surrounding environment to the driver. The map display scale may be determined based on the vehicle speed, the location of the vehicle, the type of location of the vehicle, traffic conditions, and/or user preferences. The map displayed may show a given number of minutes ahead of the vehicle instead of a distance. For example, the map may display the roads which are 4 minutes ahead of the vehicle instead of showing 4 miles ahead of the vehicle. In this way, as the vehicle speeds up, the map display scale is adjusted to automatically zoom out, and when the vehicle slows down, the map display scale is adjusted to automatically zoom in. The speed of the vehicle may be determined by a speedometer or may be estimated based on a type of road and traffic data. The system described herein provides a safer, more accurate map for the driver to view while the driver is operating the vehicle.

FIG. 1A illustrates a display 10 showing a map 18 and an icon 16 representing the vehicle. Adjacent to the display 10 are zoom buttons 12 for zooming in or zooming out on the map 18. The display 10 and the zoom buttons 12 may be part of an infotainment system 20.

As displayed by display 10, the map 18 includes a road 22 and the sides 24 adjacent to the road 22. The display 10 also shows a route 26 for the vehicle to take. As shown in FIG. 1A, the displayed map 18 may be zoomed in too much to be useful to the driver. Notably, the map 18 does not show a next turning location or any other map features, such as a cross street. The driver may adjust the map display scale manually using the zoom buttons 12, but this may be distracting to the driver, and the driver may not know which zoom amount is best. Further, the zoom levels may be a series of discrete steps, and an optimal zoom level may be between two of the discrete zoom steps, such that the driver is unable to achieve the optimal zoom level.

FIG. 1B illustrates the display 10 showing the map 18 and the icon 16 representing the vehicle. The display 10 may be a touchscreen and also show virtual zoom buttons 14 for zooming in or zooming out. The display 10 may be part of the infotainment system 20.

As displayed by the display 10, the map 18 shows a route 26 for the vehicle to take. The displayed map 18 may be zoomed out too much to be useful to the driver. Notably, the map 18 does not clearly show which streets to turn on, as there may be any number of streets in close proximity at the various turning locations. In addition, there may be information about features, such as median islands and turning lanes, which are not displayed in the map 18. Again, the driver could zoom in using the virtual zoom buttons 14, but this may be distracting to the driver, and the optimal zoom level may not be able to be shown.

FIG. 2A illustrates a display 108 showing a map 212 and an icon 28 representing the vehicle. The map 212 has four edges defining the boundaries of the map 212, including a front boundary 204. The icon 28 representing the vehicle is facing the front boundary 204. The map 212 may be oriented so that the icon 28 faces the front boundary 204 always, regardless of which direction is north. Alternatively, the map 212 may be oriented so that the top edge is north, the right edge is east, the bottom edge is south, and the left edge is west, and the icon 28 may be facing any of the edges, depending on the direction the vehicle is driving. In these embodiments, the front boundary 204 may change based on the direction the vehicle is travelling and may accordingly be an edge other than the top edge, as shown in FIGS. 2A and 2B.

The icon 28 is separated from the front boundary 204 by a temporal map distance 216. The temporal map distance 216 represents an amount of time it would take the vehicle to reach the front boundary 204 (e.g., 1 minute or 2 minutes) if the current speed 206 is maintained. The current speed 206 may be measured by a speedometer 208. The current speed 206 may also be approximated based on map data and traffic data. The map data may indicate a type of road being traversed, and an average speed of vehicles travelling on the type of road may be stored and referenced. The referenced speed may be adjusted based on the traffic data. The approximated speed may be adjusted to a lower speed when the traffic data indicates heavy traffic, or the approximated speed may be adjusted to a higher speed when the traffic data indicates no traffic.

Notably, the temporal map distance 216 separating the icon 28 and the front boundary 204 does not represent a constant physical distance between the vehicle and the location in the real world corresponding to the front boundary 204 (e.g., 1 mile or 2 miles). If the temporal map distance 216 was maintained to represent a constant physical distance, the map 212 may be too zoomed in, as in FIG. 1A when the assigned physical distance is overly short, and the map 212 may be too zoomed out, as in FIG. 1B, when the assigned physical distance is overly long.

The map 212 of FIG. 2A shows the icon 28 and the route 220 with enough detail that the driver can see the turn to be made, but also not with so much detail that the driver does not see the surrounding areas of the map 212.

FIG. 2B illustrates the display 108 showing a map 214, the icon 28 representing the vehicle, and a route 222 when the speed is increased to a higher speed 210, as detected by the speedometer 208. Due to the higher speed 210, the map 214 is more zoomed out than the map 212 in FIG. 2A. However, the temporal map distance 218 between the icon 28 and the front boundary 204 still represents a same or substantially the same time as the temporal map distance 216 of FIG. 2A. That is, if the temporal map distance 216 represented 4 minutes of travel time for the vehicle to reach the location represented by the front boundary 204, the temporal map distance 218 also represents 4 minutes of travel time for the vehicle to reach the location represented by the front boundary 204. The map 214 is more zoomed out than the map 212 because the physical spatial distance corresponding with the temporal map distance 218 is greater than the physical spatial distance corresponding with the temporal map distance 216.

The map 214 of FIG. 2B shows the icon 28 and the route 222 with enough detail that the driver can see the turn to be made, but also not with so much detail that the driver does not see the surrounding areas of the map 214.

In some embodiments, the temporal map distance 216, 218 may adjust based on the location of the vehicle. For example, when the vehicle is driving on a freeway, a temporal map distance representing a travel time of 6 minutes may be appropriate, and when the vehicle is driving in traffic on surface streets, a temporal map distance representing a travel time of 1 minute may be appropriate.

FIG. 3A illustrates an exemplary user interface 300 of the automatic vehicle map display system. The user interface 300 may be presented by a navigation system of an infotainment unit of the vehicle during setup, or may be available as a navigation system setting. The driver may select between an automatic map scaling 302 or a manual map scaling 304. When automatic map scaling is chosen, the map zooms in and out automatically and dynamically, as described herein. This results in the dynamic, real-time, automatic adjustment/scaling of the map. When manual map scaling is chosen, the map may be zoomed in or zoomed out by the user, using zoom buttons such as zoom buttons 12, 14 of FIGS. 1A and 1B, respectively.

Figure 3B:
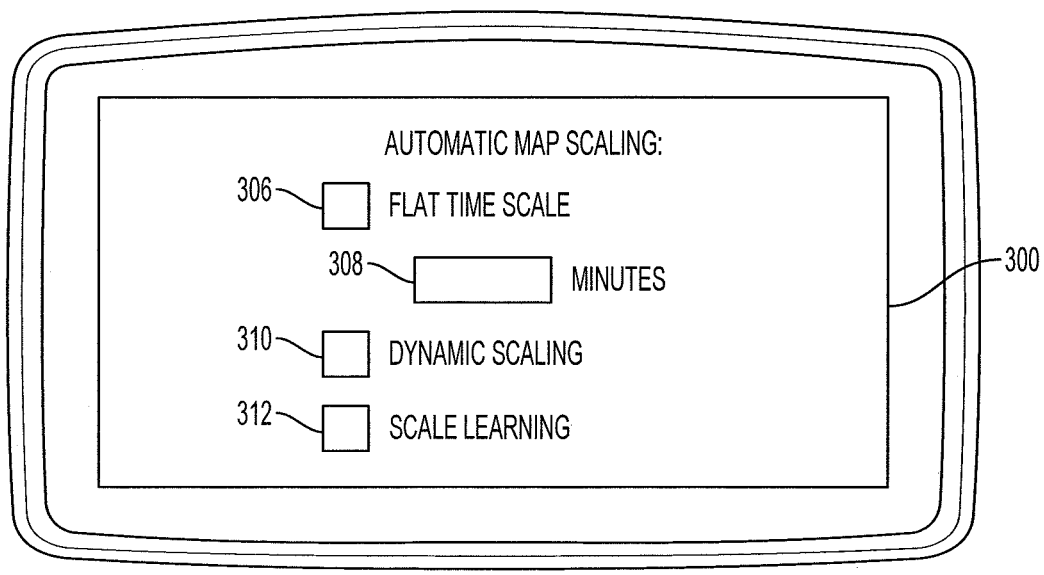

FIG. 3B illustrates the user interface 300 presenting additional setup options for the user. The user may pick between a flat time scale option 306 or a dynamic scaling option 310. When the flat time scale option 306 is selected, a flat amount of time corresponding to the temporal map distance (e.g., temporal map distance 216, 218) may be used, regardless of the location of the vehicle. Further, the user may specify the time associated with the temporal map distance by entering in a time amount in the time field 308. The time field may be in any unit of time, such as minutes or seconds, for example. In some embodiments, instead of a measure of time, a scale from 1-10 or 1-100 may be used to represent the temporal map distance. The value entered by the user may be referred to as a target zoom level.

When the dynamic scaling option 310 is selected, the map may be scaled automatically based on one or more factors, such as speed of the vehicle, the location of the vehicle, whether the vehicle is being driven in the city or on a highway, and user preferences.

When the scale learning option 312 is selected, the system may record the user's map scaling preferences and use it as a factor in dynamic scaling. For example, the user may manually zoom in or out at a particular freeway during traffic, and the system may store these manual adjustments in the memory. When the scale learning option 312 is selected, the system may determine, based on the manual adjustments, that the user prefers to zoom out when the user is on the freeway, or that the user prefers to zoom out when the user is in the city, stuck in traffic, for example. The next time the vehicle 202 is in traffic or on a freeway, the previous manual adjustment by the user may be factored in to the determination of which scale to use. In some embodiments, once a threshold number of manual adjustments are made, the user adjustment history is taken into account when determining the map display scale.

Figure 3C:
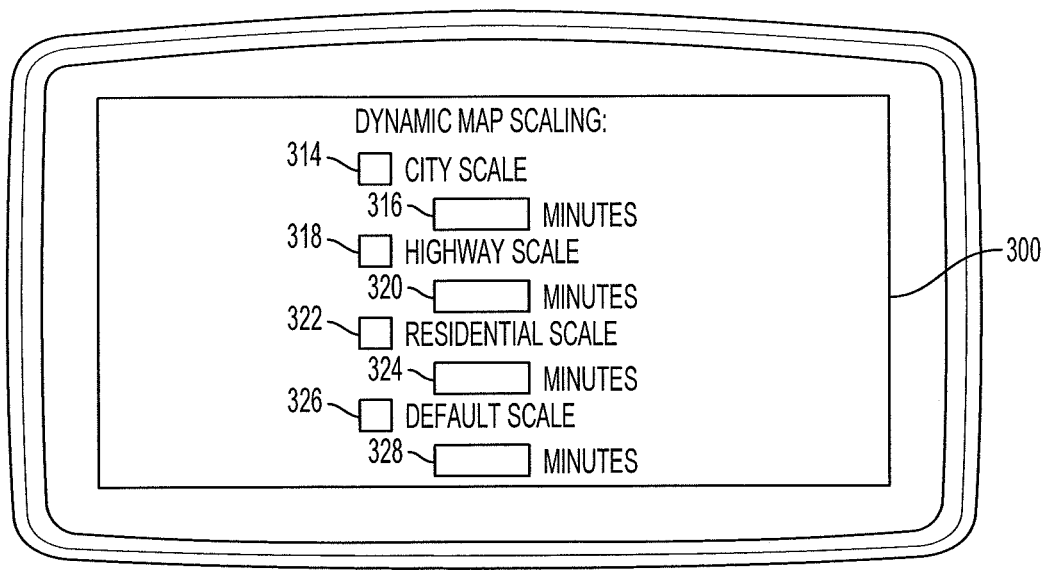

When the dynamic scaling option 310 is selected, a dynamic map scaling options interface may be presented, as illustrated in FIG. 3C. The user may specify a target zoom level based on a number of minutes. The number of minutes may represent a number of minutes away a location at the top of the screen is away from the current location of the vehicle (e.g., the temporal map distance).

As shown in FIG. 3C, a number of different environments may have a respective target zoom level in terms of minutes. For example, a separate target zoom level may be used for city, highway, residential, high vehicle density or traffic areas, low vehicle density or traffic areas, or default for all other situations. Whether one or more specific target zoom levels are used may be determined individually, and the user may indicate whether a particular target zoom level is used. For example, the user may press an icon 314 to indicate whether to use a particular target zoom level when in a city, and a number of minutes corresponding to the desired target zoom level may be input in field 316. The user may press an icon 318 to indicate whether to use a particular target zoom level when on a highway, and a number of minutes corresponding to the desired target zoom level may be input in field 320. The user may press an icon 322 to indicate whether to use a particular target zoom level when in a residential area, and a number of minutes corresponding to the desired target zoom level may be input in field 324. The user may press an icon 326 to indicate whether to use a particular target zoom level when none of the other situations are applicable, and a number of minutes corresponding to the desired target zoom level may be input in field 328. In some embodiments, the default target zoom level is not optional. When an icon 314, 318, 322 corresponding to an environment is not activated, the default target zoom level may be used for that environment and all other unactivated or unspecified environments. The list of environments shown in FIG. 3C is not exhaustive and merely illustrative. In some embodiments, new environments may be added by the user via an input unit.

Figure 3D:
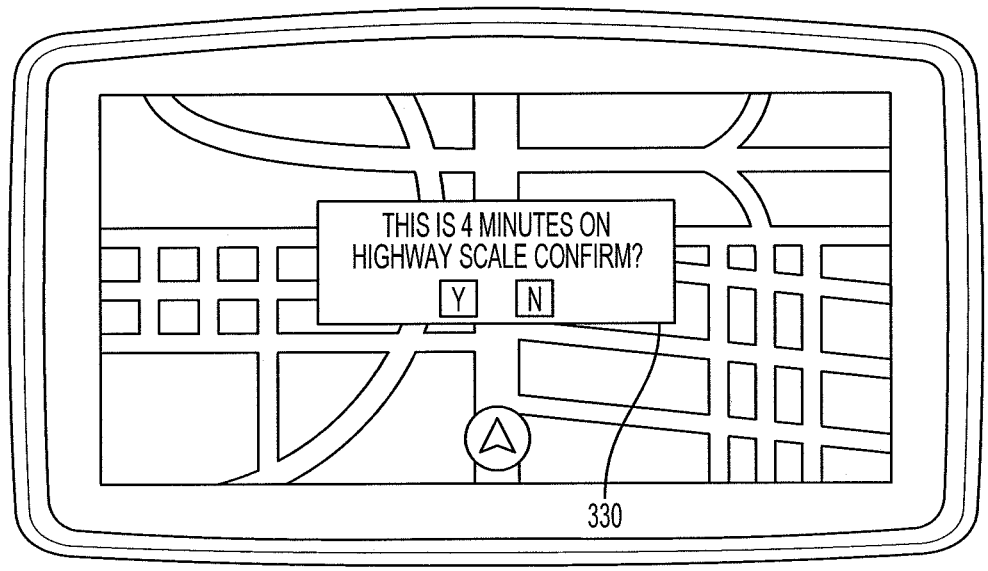

In some situations, the user may not immediately recognize or appreciate how zoomed in or out a map showing a particular number of minutes is. For example, a user may not know whether the user would prefer a target zoom level of 3 minutes on a freeway or a target zoom level of 8 minutes on a freeway, or any other number of minutes. Accordingly, in some embodiments, the system may display a preview of the map, as shown in FIG. 3D. The preview may include a confirmation screen 330 describing the environment, current map display scale, and including a Yes icon and a No icon, for the user to press based on whether the user would like to keep the map display scale used in the preview. The preview may be presented immediately after the user has input a number of minutes in the field 308 of FIG. 3B or field 316, 320, 324, 328 of FIG. 3C. The preview of the map may be presented after all of the fields of a screen have been entered, or the previews may be shown one after another, if there are multiple map display scales specified in a screen, such as in FIG. 3C.

Figure 3E:
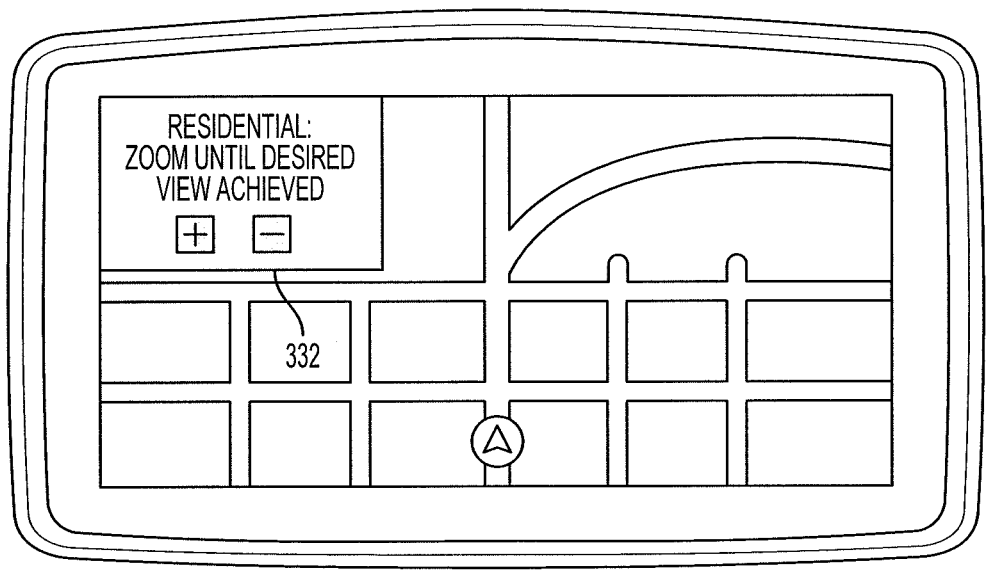

Alternatively, or in addition, the map display scale may be determined by a user's manual adjustment of zooming in or out, in a given environment. As shown in FIG. 3E, for a residential area, the user may zoom in or out using the icons provided in the window 332. The zoom amount may be translated to minutes and saved by the system, or the zoom amount may be saved as a target zoom value. The equivalent number of minutes may be shown to the user so the user may become more familiar with a map scaling in terms of time.

Figure 4:
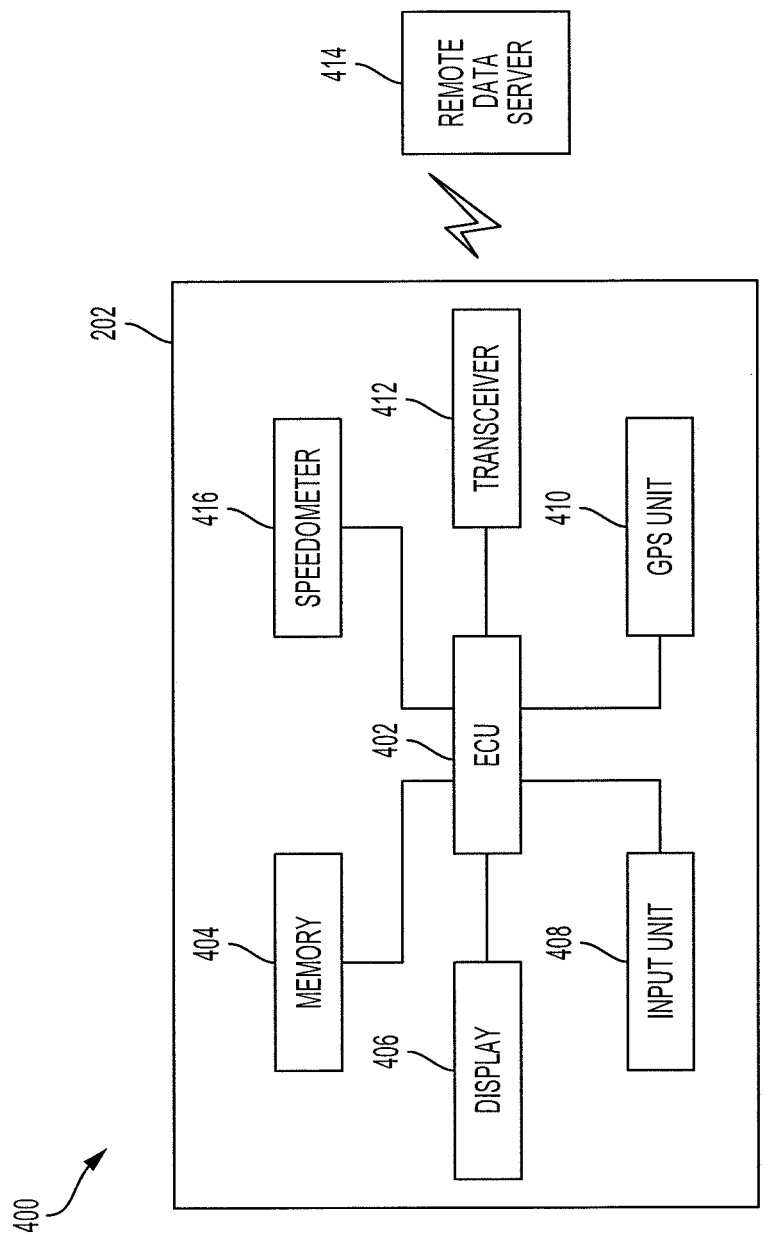
FIG. 4 illustrates an exemplary automatic vehicle map display system, according to various embodiments of the invention.

FIG. 4 illustrates an exemplary automatic vehicle map display system, according to various embodiments of the invention. The system 400 includes a vehicle 202. The vehicle 202 may be a fully electric vehicle, a partially electric vehicle, or a conventional vehicle powered by an internal combustion engine. The vehicle 202 is a conveyance capable of transporting a person, an object, or a permanently or temporarily affixed apparatus. The vehicle 202 may be a self-propelled wheeled conveyance, such as a car, a sports utility vehicle, a truck, a bus, a van or other motor or battery driven vehicle. For example, the vehicle 202 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 202 may be a semi-autonomous vehicle or an autonomous vehicle. That is, the vehicle 202 may be self-maneuvering and navigate without human input. An autonomous vehicle may use one or more sensors and/or a navigation unit to drive autonomously.

The vehicle 202 may include one or more computers or electronic control units (ECUs) 402, appropriately programmed, to control one or more operations of the vehicle 202. The one or more ECUs 402 may be implemented as a single ECU or in multiple ECUs. The one or more ECUs may be one or more computer processors or controllers. The ECU 402 may be electrically coupled to some or all of the components of the vehicle 202. In some embodiments, the ECU 402 is a central ECU configured to control one or more operations of the entire vehicle 202. In some embodiments, the ECU 402 is multiple ECUs located across the vehicle 202 and each configured to control one or more local operations of the vehicle 202. The ECU 402 is configured to determine a map display scale based on the the vehicle speed, the location, the traffic data, and/or user preferences, and also configured to render a map using the determined map display scale.

The vehicle 202 may include an input unit 408. The input unit 408 may be configured to receive input from a user, such as an occupant of the vehicle 202. The input unit 408 may be a touchscreen display of an infotainment unit, a microphone, a keyboard, a camera configured to detect motions, or one or more dials and/or buttons. The input unit 104 may be used to enter a destination or to navigate between menu screens of a user interface. The input unit 408 may also be used to input a map scaling in terms of time, as shown in FIG. 3C.

The vehicle 202 may be coupled to a network. The network, such as a local area network (LAN), a wide area network (WAN), a cellular network, a digital short-range communication (DSRC), the Internet, or a combination thereof, connects the vehicle 202 to a remote data server 414. The remote data server 414 may be one or more servers from different service providers. Each of the one or more servers may be connected to one or more databases. A service provider may provide navigational map, weather and/or traffic data to the vehicle 202.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such as the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitude coordinates.

The transceiver 412 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 412 may transmit data to and receive data from devices and systems not directly connected to the vehicle 202. For example, the ECU 402 may communicate with the remote data server 414. Furthermore, the transceiver 412 may access the network, to which the remote data server 414 is also connected.

The GPS unit 410 is connected to the ECU 402 and configured to determine location data. The ECU 402 may use the location data along with map data to determine a location of the vehicle 202. In other embodiments, the GPS unit 410 has access to map data and may determine the location of the vehicle 202 and provide the location of the vehicle 202 to the ECU 402.

The memory 404 is connected to the ECU 402 and may be connected to any other component of the vehicle 202. The memory 404 is configured to store any data described herein, such as map data, location data, and any data received from the remote data server 414 via the transceiver 412. The memory 404 is also configured to store any data described herein, including but not limited to, vehicle speeds associated with a particular environment or location and user manual zoom adjustment history.

The vehicle 202 has a speed sensor (e.g., a speedometer 416) configured to detect a speed of the vehicle 202, which may be used to determine an appropriate map display scale. In some embodiments, the speed sensor is a speedometer 416. In other embodiments, the speed sensor is a rotation sensor mounted in a vehicle transmission and configured to detect the rotational speed of the driveshaft. In other embodiments, the speed sensor is a wheel speed sensor configured to detect a speed of the wheel rotation of the vehicle 202.

The display 406 is configured to display a map of the current location or a desired destination of the vehicle, and/or the map settings. The display 406 may be part of an infotainment unit and may also present navigation instructions from the current location to the desired destination. The display 406 may include multiple display screens. For example, the display 406 may be two screens—one for displaying a map, and another for displaying settings of the navigation map.

In some embodiments, the system may use discrete display scales instead of a continuous adjustment of display scales based on the vehicle speed, as there may be latency issues which may cause the map to lag behind in scaling, particularly when the vehicle alternates between accelerating and decelerating in a short period of time.

In an example embodiment, a first display scale may be used while the vehicle is travelling between 0 miles per hour and a first speed threshold. A second display scale may be used while the vehicle is travelling between the first speed threshold and a second speed threshold. A third display scale may be used while the vehicle is travelling between the second speed threshold and the third speed threshold.

However, when discrete display scales are used, when the vehicle goes back and forth above and below the first speed threshold or the second speed threshold, a sudden and lagged zooming in and zooming out may occur, as the map toggles between two different display scales. In order to address this hysteresis, the system may delay the transition from one display scale to another.

The delayed transition may be implemented by not transitioning from a first display scale to a second display scale until the vehicle remains driving at the speed associated with the second display scale for a threshold period of time. For example, if the speed threshold to go from the first scaling level to the second scaling level is 30 miles per hour and the threshold period of time is 30 seconds, if the vehicle reaches 32 miles per hour for 20 seconds, but then goes back down to 28 miles per hour, the map display scale is not switched from the first display scale to the second display scale. However, if the vehicle had continued driving at 32 miles per hour for 30 or more seconds, the map display scale would have switched from the first display scale to the second display scale when the threshold period of time was met. Each time the vehicle speed crosses a speed threshold, the period of time to be elapsed to change the map display scale is reset.

The delayed transition may also be implemented using an upper and lower speed threshold. A given speed threshold may have an upper speed threshold greater than the given speed threshold and a lower speed threshold lesser than the given speed threshold. When the vehicle is accelerating, the map display scale may not be changed until the upper speed threshold is reached, and when the vehicle is decelerating, the map display scale may not be changed until the lower speed threshold is reached. For example, if the speed threshold is 30 miles per hour, the upper speed threshold is 33 miles per hour, and the lower speed threshold is 27 miles per hour, a vehicle starting at 0 miles per hour would display a map using a first display scale until the vehicle reached 33 miles per hour, at which point it would use the second display scale. If the vehicle decelerated down to 28 miles per hour, the second display scale would remain displayed until the vehicle reached 27 miles per hour. When the vehicle reaches 27 miles per hour, the first display scale is used again. If the vehicle remained at 28 miles per hour, the second display scale would remain in use. In some embodiments, these two approaches may be combined, such that even if the vehicle remains at 28 miles per hour, if a threshold period of time elapses, the map would transition from the second display scale to the first display scale, as the vehicle is travelling below the speed threshold.

Figure 5:
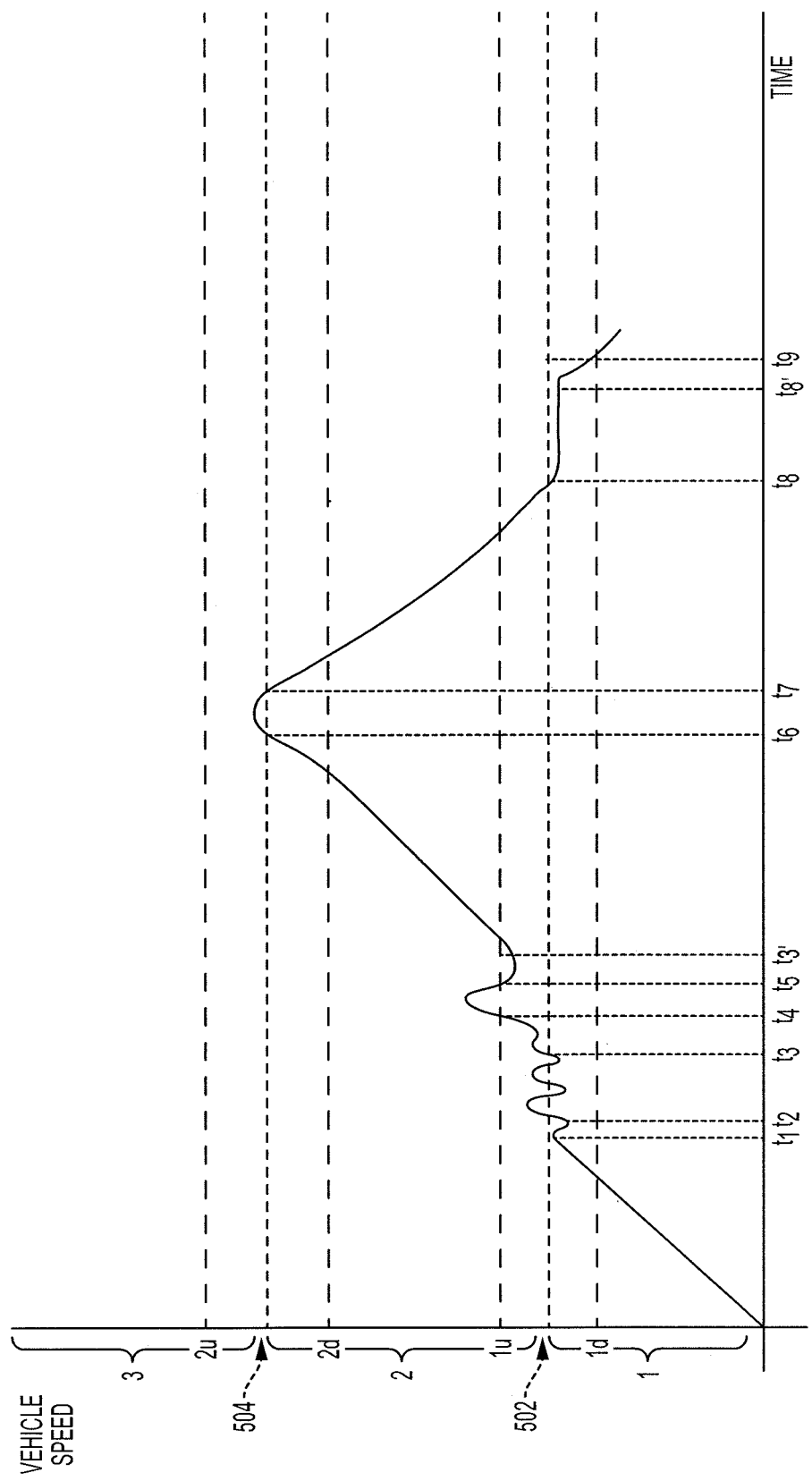
FIG. 5 is a graph illustrating delayed transition when discrete scaling levels are used, according to various embodiments of the invention.

FIG. 5 is a graph illustrating the delayed transition when discrete scaling levels are used in the automatic vehicle map display system. The discrete scaling levels may be referred to as vehicle speed ranges each associated with a map display scale. Each vehicle speed range may be defined by an upper threshold and a lower threshold. For example, the lowest vehicle speed range shown in FIG. 5 is defined by an upper threshold of 502 (a first speed threshold) and a lower threshold of 0. The next higher vehicle speed range shown in FIG. 5 is defined by an upper threshold of 504 (a second speed threshold) and a lower threshold of 502 (the first speed threshold).

The vehicle 202 begins by driving below the first speed threshold 502. While the vehicle 202 drives below the first speed threshold 502, a first map display scale is used. The vehicle 202 drives below the first speed threshold 502 until time t1 but does not exceed the first speed threshold 502. At time t1, the vehicle 202 slows down. The first display map scale remains in use.

At time t2, the vehicle 202 accelerates and decelerates above and below the first speed threshold 502 until time t3. If a delayed transition were not used, between times t2 and t3, the map would zoom in and out drastically and distractingly, making it difficult for the user to follow along. However, since delayed transition is being used, the first map display scale is used.

At time t3, the vehicle remains above the first speed threshold 502. In some embodiments, the second map display scale is not used until a threshold period of time elapses. This period of time is achieved at t3' and at that point, the second map display scale is used. In this example, t3'-t3 represents the threshold period of time.

In other embodiments, the second map display scale is not used until the upper threshold $1u$ is reached, at t4. In these embodiments, once the upper threshold $1u$ is reached, the first map display scale is not used until the lower threshold $1d$ is reached. Accordingly, at time t5, even though the vehicle speed is below $1u$, it is not below $1d$, so the second map display scale is maintained.

At time t6, the second speed threshold 504 is reached. In those embodiments where the next map display scale is not used until a threshold period of time elapses, the third map display scale is not used, since the vehicle speed falls below the second speed threshold 504 at t7, before the threshold period of time elapses. In those embodiments where the next map display scale is not used until the corresponding upper or lower threshold is crossed, again, the third map display scale is not used, since the upper threshold $2u$ is not crossed. Thus, during t6 to t7, the second map display scale is maintained.

The vehicle decelerates until it is travelling at a speed below the first speed threshold 502 at t8. The map may not change to the first map display scale at t8. In some embodiments, the map does not change to the first map display scale until the lower boundary $1d$ is eventually crossed at t9. In other embodiments, the map does not change to the first map display scale until the time threshold has been reached at t8'. The time threshold represented by t8'-t8 may be equal to the time threshold represented by t3'-t3.

Figure 6:
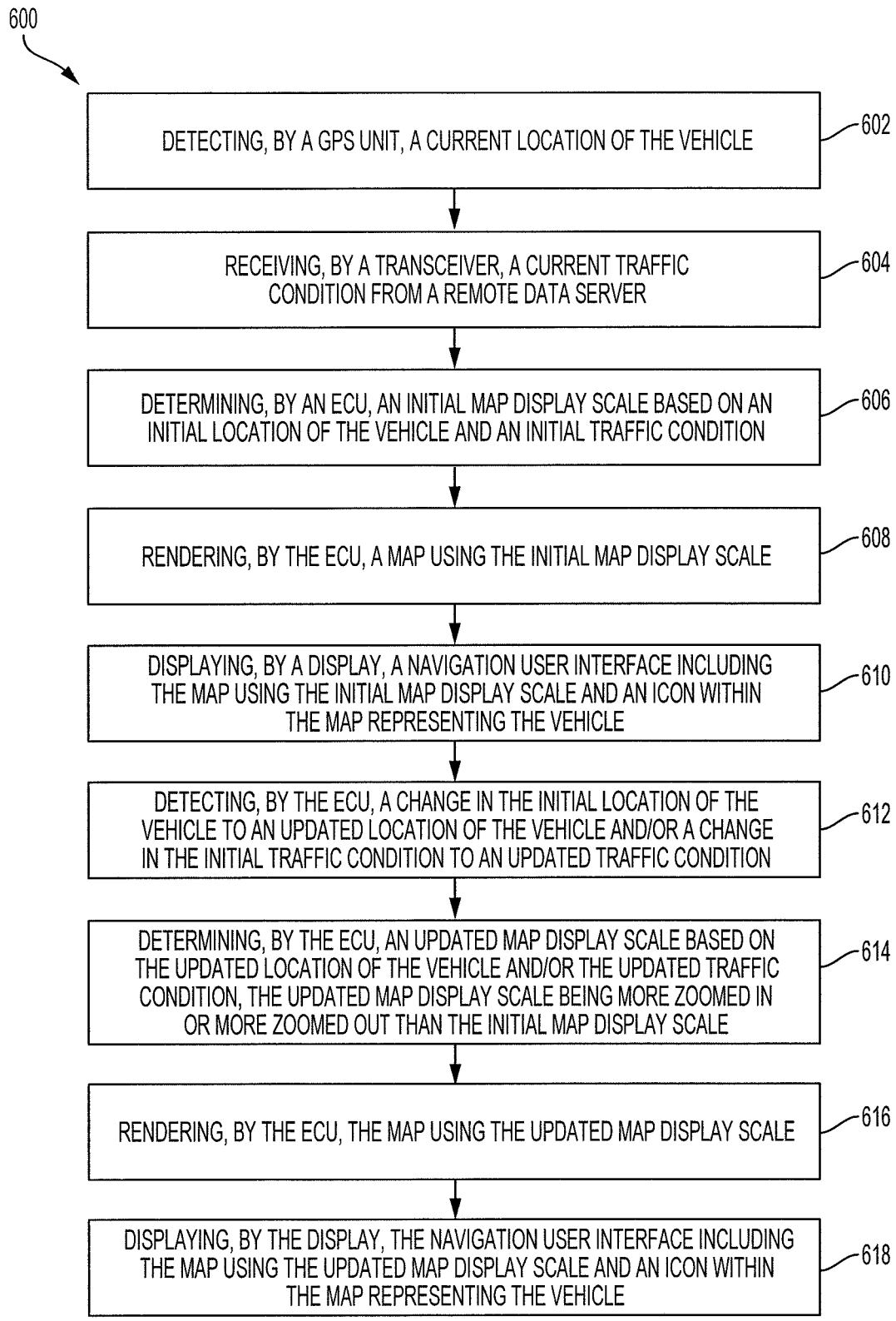
FIG. 6 illustrates a flow diagram of a process performed by the automatic vehicle map display system, according to various embodiments of the invention.

FIG. 6 illustrates a flow diagram of a process 600 performed by the automatic vehicle map display system.

The GPS unit 410 detects a current location of the vehicle 202 (step 602). The current location of the vehicle 202 may be determined in terms of a geographic location, such as latitude and longitude coordinates. In some embodiments, an environment table saved in the memory 404 is referenced to determine an environment corresponding to the geographic location. For example, 34.088284, −118.236381 may be referenced as a freeway. The GPS unit 410 may determine both the geographic location and the associated environment, or the GPS unit 410 may determine the geographic location and the ECU 402 may determine the associated environment.

A transceiver 412 receives a current traffic condition from a remote data server 414 (step 604). The current traffic condition may be associated with the current location of the vehicle 202 or may be associated with roads in the vicinity of the current location of the vehicle 202 or may be associated with roads along a current route or all possible routes between the current location of the vehicle 202 and a destination.

An ECU 402 determines an initial map display scale based on an initial location of the vehicle 202 and an initial traffic condition (step 606). The ECU 402 may reference a map zoom table, as shown in FIG. 7, to determine an initial map display scale based on a given location (or environment) and a given traffic state. The initial map display scale may be represented in terms of a time value associated with the temporal map distance, or may be a value on a scale, each value on the scale being associated with a map display scale. For example, if the vehicle 202 is at 34.088284, −118.236381 (which is determined to be a freeway) and the traffic condition is moderate traffic, the initial map display scale is 2 minutes, according to table 700. The map zoom table may be stored in the memory 404.

The ECU 402 renders a map using the initial map display scale (step 608). The display 406 displays a navigation user interface including the map using the initial map display scale and an icon within the map representing the vehicle (step 610). This initial map display scale determined by the ECU 402 is an improvement over conventional systems in that the display is customized for the current situation of the vehicle 202 and automatically determined and displayed.

The ECU 402 detects a change in the initial location of the vehicle to an updated location of the vehicle and/or a change in the initial traffic condition to an updated traffic condition (step 612). As illustrated in FIG. 7, a change to the location of the vehicle or the traffic condition of the location of the vehicle may result in a different associated map display scale being used.

The ECU 402 determines an updated map display scale based on the updated location of the vehicle and/or the updated traffic condition, the updated map display scale being more zoomed in or more zoomed out than the initial map display scale (step 614). The updated map display scale may be determined based on a map zoom table, such as map zoom table 700 of FIG. 7.

The ECU 402 renders the map using the updated map display scale (step 616). The display 406 displays the navigation user interface including the map using the updated map display scale and an icon within the map representing the vehicle (step 618).

In some embodiments where the navigation system is guiding the driver to a destination along a route, the ECU 402 may anticipate an upcoming map display scale which is different from the current map display scale. In these situations, the ECU 402 may transition from the current map display scale to the anticipated map display scale more gradually or more promptly.

FIG. 7 illustrates an example map zoom table 700. The map zoom table 700 provides a map display scale for a given location and a given traffic condition. In some embodiments, when the traffic condition is not known or cannot be determined, an average of the map display scales may be used. In some embodiments, when the location is not known or cannot be determined, a default location may be used. The map display scale values may be in terms of a time value, as shown in map zoom table 700, or may be in terms of a numerical value in a scale, with each numerical value in the scale associated with a different map display scale.

The input unit 408 may receive manual user zoom adjustments which are manually input by the user. The map zoom table 700 may be adjusted and updated based on the manual user zoom adjustments. For example, if the user manually zooms out when the user is in a residential area in heavy traffic such that the temporal map distance is 1 minute, the ECU 402 may update the map zoom table 700 to update the corresponding entry from 30 seconds to 1 minute. In some embodiments, the ECU 402 does not update the map zoom table 700 until the number of times the user manually adjusts the map display scale exceeds a threshold number of times.

While the map zoom table 700 illustrates various relative scales for different situations, in some embodiments, the relative scales may be different than the map zoom table 700 illustrated in FIG. 7. For example, in map zoom table 700, in heavier traffic, the map display scale is shorter (i.e., more zoomed in), but in some embodiments, in heavier traffic, the map display scale may be longer (i.e., more zoomed out). These settings may be set by the user or operator of the vehicle.

Figure 8A:
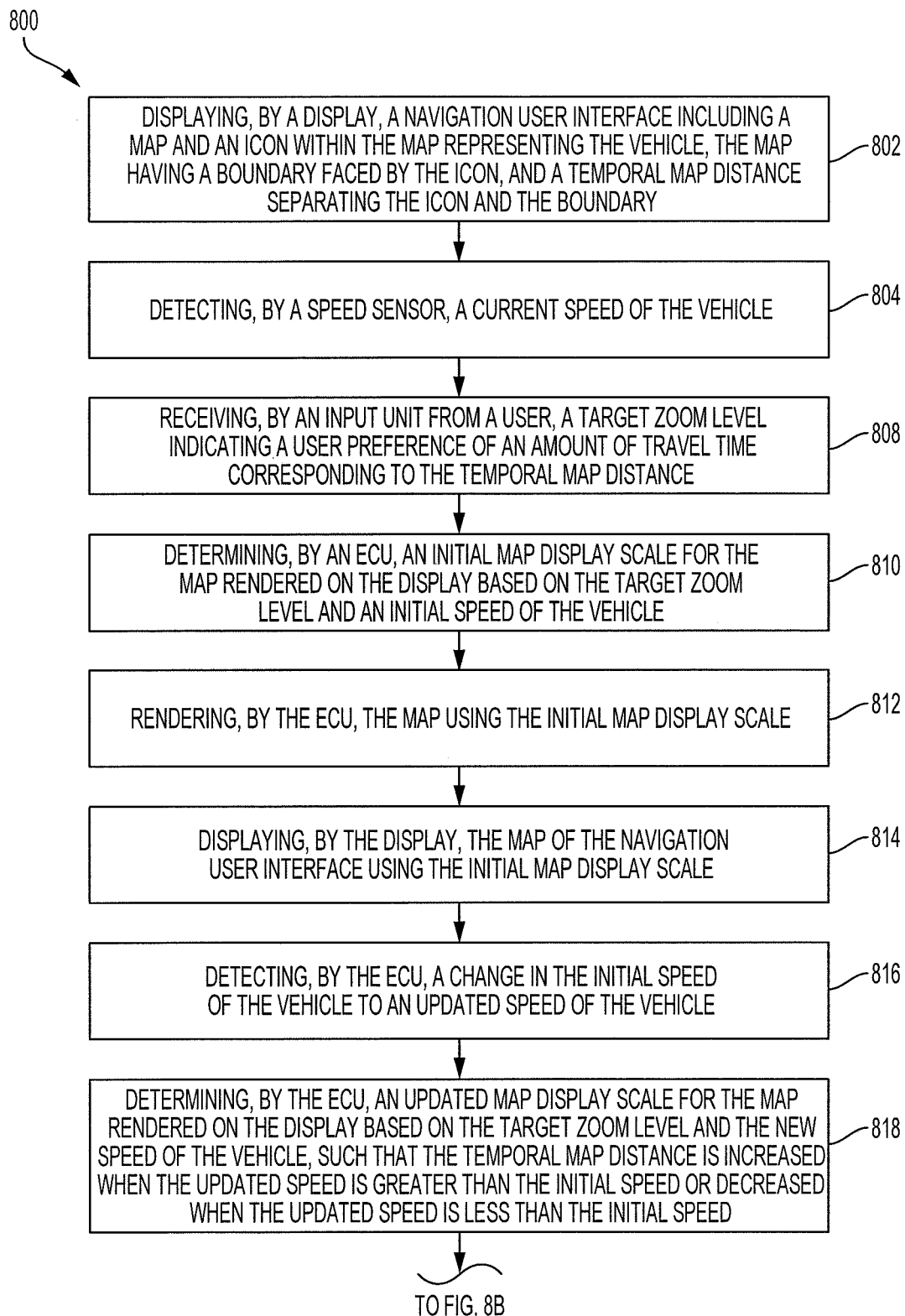
FIGS. 8A-8B illustrate a flow diagram of a process performed by the automatic vehicle map display system, according to various embodiments of the invention.
Figure 8B:
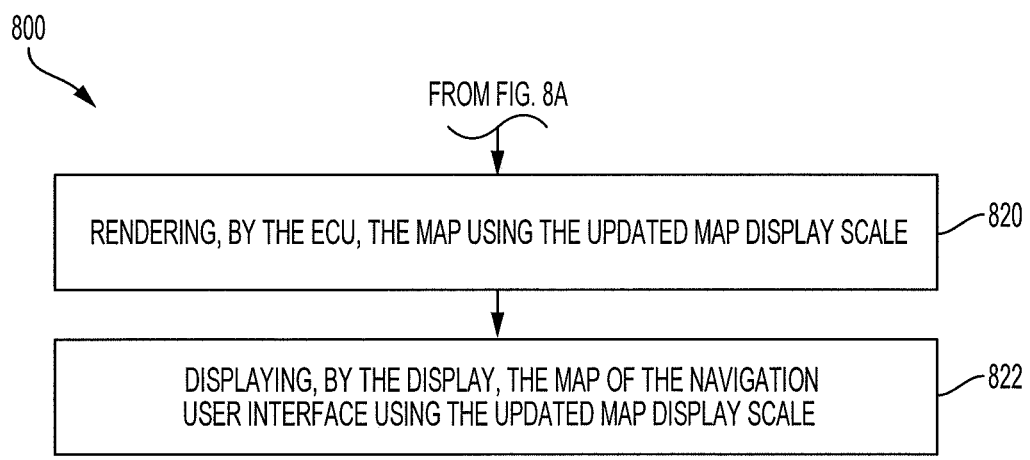

FIGS. 8A-8B illustrate a flow diagram of a process 800 performed by the automatic vehicle map display system.

A display 406 displays a navigation user interface including a map and an icon within the map representing the vehicle, the map having a boundary faced by the icon, and a temporal map distance separating the icon and the boundary (step 802).

A speed sensor (e.g., speedometer 416) detects a current speed of the vehicle 202 (step 804). The speed sensor may detect the current speed of the vehicle 202 in terms of a distance per unit of time.

An input unit 408 receives, from a user, a target zoom level indicating a user preference of an amount of travel time corresponding to the temporal map distance (step 806). The input unit 408 may be a touchscreen display of an infotainment unit, or may be a keypad or keyboard, for example.

An ECU 402 determines an initial map display scale for the map rendered on the display based on the target zoom level and an initial speed of the vehicle (step 808). The target zoom level may specify a temporal map distance, and the ECU 402 may determine the map display scale in order to maintain the temporal map distance on the map as the vehicle 202 travels at the initial speed.

The ECU 402 renders the map using the initial map display scale (step 810). The display 406 displays the map of the navigation user interface using the initial map display scale (step 812).

The ECU 402 detects a change in the initial speed of the vehicle to an updated speed of the vehicle (step 814). The change to the initial speed of the vehicle to an updated speed may be detected by the speed sensor and communicated to the ECU 402.

The ECU determines an updated map display scale for the map rendered on the display based on the target zoom level and the new speed of the vehicle, such that the temporal map distance is increased when the updated speed is greater than the initial speed or decreased when the updated speed is less than the initial speed (step 816). In order to maintain the temporal map distance, the map display scale may be updated when the vehicle 202 speeds up or slows down.

In some embodiments, as illustrated in FIG. 5, the map display scales used may be adjusted on a discrete basis, such that each increase or decrease of vehicle speed may not result in an adjustment of the map display scale. In these embodiments, a finite number of map display scales may be used, and the map display scale used to display the map may change from a first vehicle speed to a second vehicle speed only when the first vehicle speed is within a first bound and the second vehicle speed is within a second bound. For example, a first map display scale may be used when the vehicle is travelling between 0 miles per hour and 30 miles per hour; a second map display scale may be used when the vehicle is travelling between 31 miles per hour and 60 miles per hour; and a third map display scale may be used when the vehicle is travelling above 61 miles per hour.

As described herein with respect to FIG. 5, the transition from one map display scale to another in these embodiments may be delayed by a threshold amount of time. The threshold amount of time may be determined by the user, the vehicle manufacturer, or another party, such as a governing body. The threshold amount of time may be stored in the memory 404.

Also as described herein with respect to FIG. 5, the transition from one map display scale to another in these embodiments may be made when the speed of the vehicle exceeds an upper vehicle speed threshold when the vehicle is accelerating, or when the speed of the vehicle is less than a lower vehicle speed threshold when the vehicle is decelerating.

The ECU 402 renders the map using the updated map display scale (step 818). The display 406 displays the map of the navigation user interface using the updated map display scale (step 820).

The input unit 408 may receive manual user zoom adjustments which are manually input by the user. The target zoom level may be adjusted and updated based on the received manual user zoom adjustments. For example, if the user had input a target zoom level of 2 minutes, but manually zooms in whenever the user looks at the map, the ECU 402 may update the target zoom level from 2 minutes to 1 minute. In some embodiments, the ECU 402 does not update the target zoom level until the number of times the user manually adjusts the map display scale exceeds a threshold number of times.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. As used herein, substantially the same may refer to a similarity within 25%.

What is claimed is:

1. A dynamically scaling navigation display system for a vehicle, comprising:
    GPS unit configured to detect a current location of the vehicle;
    a transceiver configured to receive a current traffic condition from a remote data server;
    a display configured to display a navigation user interface including a map and an icon within the map representing the vehicle;
    a memory configured to store a map zoom table identifying, for each of a plurality of location and traffic condition combinations, a corresponding map zoom level; and
    an electronic control unit (ECU) configured to:
        determine an initial map display scale based on an initial location of the vehicle, an initial traffic condition, and the map zoom table,
        render the map of the navigation user interface using the initial map display scale,
        detect at least one of a change in the initial location of the vehicle to an updated location of the vehicle or a change in the initial traffic condition to an updated traffic condition,
        determine an updated map display scale based on the map zoom table and the at least one of the updated location of the vehicle or the updated traffic condition, the updated map display scale being more zoomed in or more zoomed out than the initial map display scale, and
        render the map of the navigation user interface using the updated map display scale.

2. The system of claim 1, further comprising an input unit configured to receive manual user zoom adjustments, and
    wherein the ECU is further configured to determine the initial map display scale and the updated map display scale based on the manual user zoom adjustments.

3. The system of claim 2, further comprising a memory configured to store a history of received manual user zoom adjustments, and
    wherein the ECU is further configured to update the map zoom table based on the history of received manual user zoom adjustments.

4. The system of claim 1, further comprising as input unit configured to receive a destination, and
    wherein the ECU is further configured to:
        determine a navigation route from the current location of the vehicle to the destination,
        anticipate reaching the updated location of the vehicle, and
        transition from the initial map display scale to the updated map display scale when the updated location of the vehicle is reached.

5. The system of claim 1, wherein the map includes a boundary faced by the icon, and a temporal map distance separating the icon and the boundary, the temporal map distance being based on the initial map display scale and the updated map display scale.

6. A dynamically scaling navigation display system for a vehicle, comprising:
    a display configured to display a navigation user interface including a map and an icon within the map representing the vehicle, the map having a boundary faced by the icon, and a temporal map distance separating the icon and the boundary;
    a speed sensor configured to detect a current speed of the vehicle;
    an input unit configured to receive, from a user, a target zoom level indicating a user preference of an amount of travel time corresponding to the temporal map distance; and
    an electronic control unit (ECU) configured to:

determine an initial map display scale for the map rendered on the display based on the target zoom level and an initial speed of the vehicle, render the map of the navigation user interface using the initial map display scale, detect a change in the initial speed of the vehicle to an updated speed of the vehicle, determine an updated map display scale for the map rendered on the display based on the target zoom level and the new speed of the vehicle, such that the temporal map distance is increased when the updated speed is greater than the initial speed or decreased when the updated speed is less than the initial, speed, and render the map of the navigation user interface using the updated map display scale.

7. The system of claim 6, wherein the input unit is further configured to receive manual user zoom adjustments, and wherein the ECU is further configured to determine the initial map display scale and the updated map display scale based on the received manual user zoom adjustments.

8. The system of claim 7, further comprising a memory configured to store a history of received manual user zoom adjustments, and wherein the ECU is further configured to adjust the target zoom level based on the history of received manual user zoom adjustments.

9. The system of claim 6, wherein the ECU is further configured to identify an initial speed range corresponding to the initial speed of the vehicle, the initial speed range being one of a plurality of vehicle speed ranges, each vehicle speed range of the plurality of vehicle speed ranges being associated with a map display scale, and wherein determining the initial map display scale comprises identifying the initial map display scale associated with the initial speed range.

10. The system of claim 9, wherein the ECU is further configured to identify an updated speed range corresponding to the updated speed of the vehicle, the updated speed range being one of the plurality of vehicle speed ranges, and wherein determining the updated map display scale comprises identifying the updated map display scale associated with the updated speed range.

11. The system of claim 10, wherein the ECU is further configured to determine whether a threshold period of time has elapsed after the updated map display scale is determined, and wherein the display displays the map using the updated map display scale when the threshold period of time has elapsed.

12. The system of claim 10, wherein each vehicle speed range of the plurality of vehicle speed ranges is defined by an upper threshold and a lower threshold, wherein the ECU is further configured to determine that the vehicle is accelerating by comparing the initial speed of the vehicle with the updated speed of the vehicle, and wherein the display displays the map using the updated map display scale when the updated speed of the vehicle exceeds the lower threshold of the updated speed range by a threshold value.

13. The system of claim 10, wherein each vehicle speed range of the plurality of vehicle speed ranges is defined by an upper threshold and a lower threshold, wherein the ECU is further configured to determine that the vehicle is decelerating by comparing the initial speed of the vehicle with the updated speed of the vehicle, and wherein the display displays the map using the updated map display scale when the updated speed of the vehicle is less than the upper threshold of the updated speed range by a threshold value.

14. A method for dynamically scaling a map of a navigation user interface of a vehicle, the method comprising:

determining, by an electronic control unit (ECU), an initial map display scale for the map based on an initial location of the vehicle or based on an initial speed of the vehicle;

rendering, by the ECU, the map with the initial map display scale;

displaying, by a display, the map with the initial map display scale;

determining, by the ECU, an updated map display scale for the map based on a change from the initial location of the vehicle to an updated location of the vehicle or based on a change from the initial speed of the vehicle to an updated speed of the vehicle;

determining whether a threshold period of time has elapsed after the updated map display scale is determined;

rendering, by the ECU, the map with the updated map display scale; and displaying, by the display, the map with the updated map display scale when the threshold period of time has elapsed.

15. The method of claim 14, wherein determining the initial map display scale based on the initial location of the vehicle comprises referencing the initial location of the vehicle on a map zoom table, and wherein determining the updated map display scale based on the updated location of the vehicle comprises referencing the updated location of the vehicle on the map zoom table.

16. The method of claim 14, further comprising receiving, from a user via an input unit, manual user zoom adjustments, and wherein determining the initial map display scale and determining the updated map display scale is based on the received manual user zoom adjustments.

17. The method of claim 16, further comprising storing, in a memory, the manual user zoom adjustments, and wherein, determining the initial map display scale and determining the updated map display scale is based on the stored manual user zoom adjustments.

18. The method of claim 14, wherein the map includes a boundary faced by an icon representing the vehicle, and a temporal map distance separating the icon and the boundary, wherein determining the initial map display scale based on the initial speed of the vehicle comprises receiving, from an input unit, a target zoom level indicating a user preference of an amount of travel time corresponding to the temporal map distance, and determining the initial map display scale based on the initial speed of the vehicle and the target zoom level, and wherein determining the updated map display scale based on the updated speed of the vehicle comprises determining the updated map display scale based on the updated speed of the vehicle and the target zoom level.

* * * * *